Dec. 28, 1926.                               1,612,203
W. MUELLER ET AL
TIRE RIM TOOL
Filed Feb. 25, 1926        2 Sheets-Sheet 2
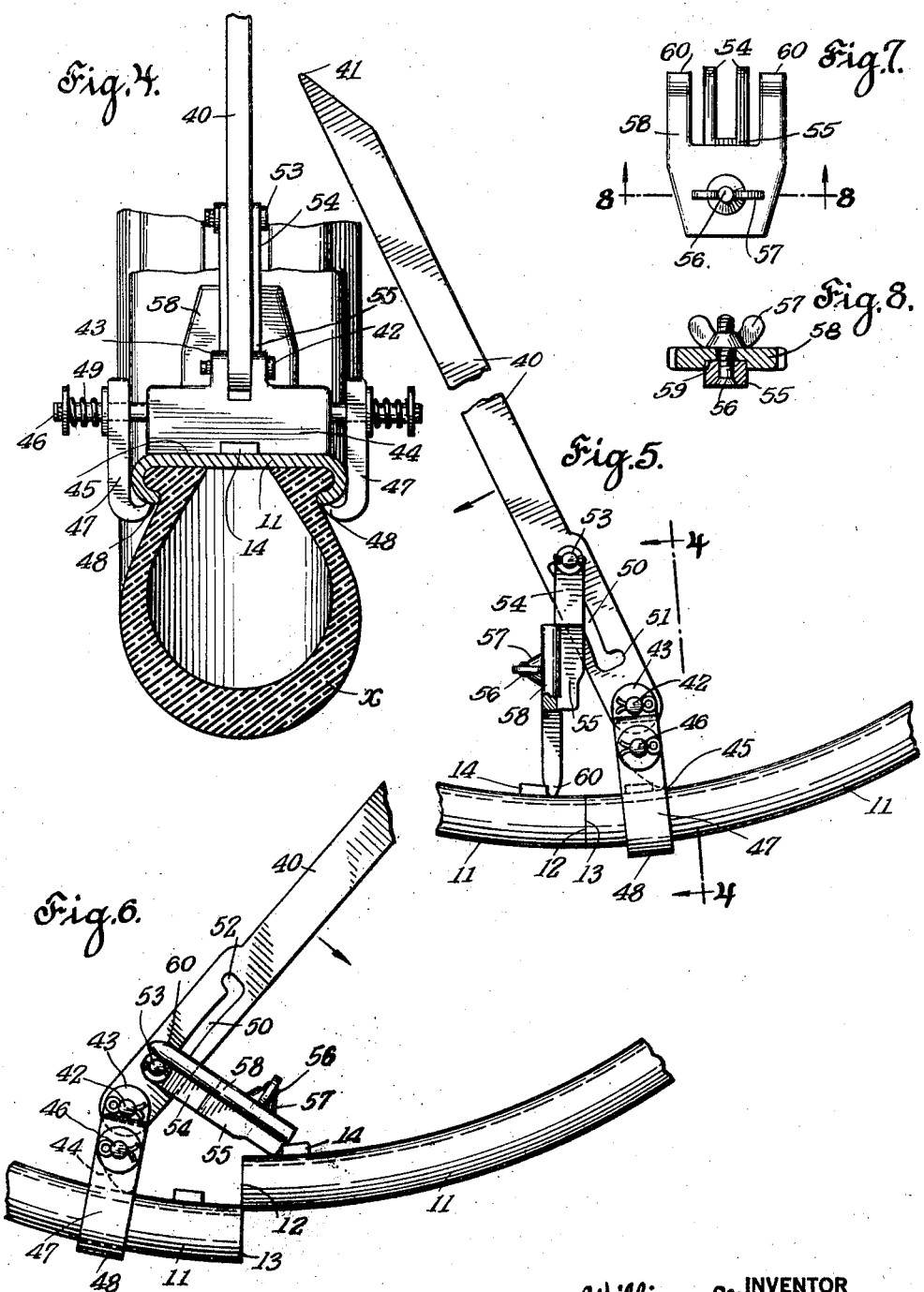

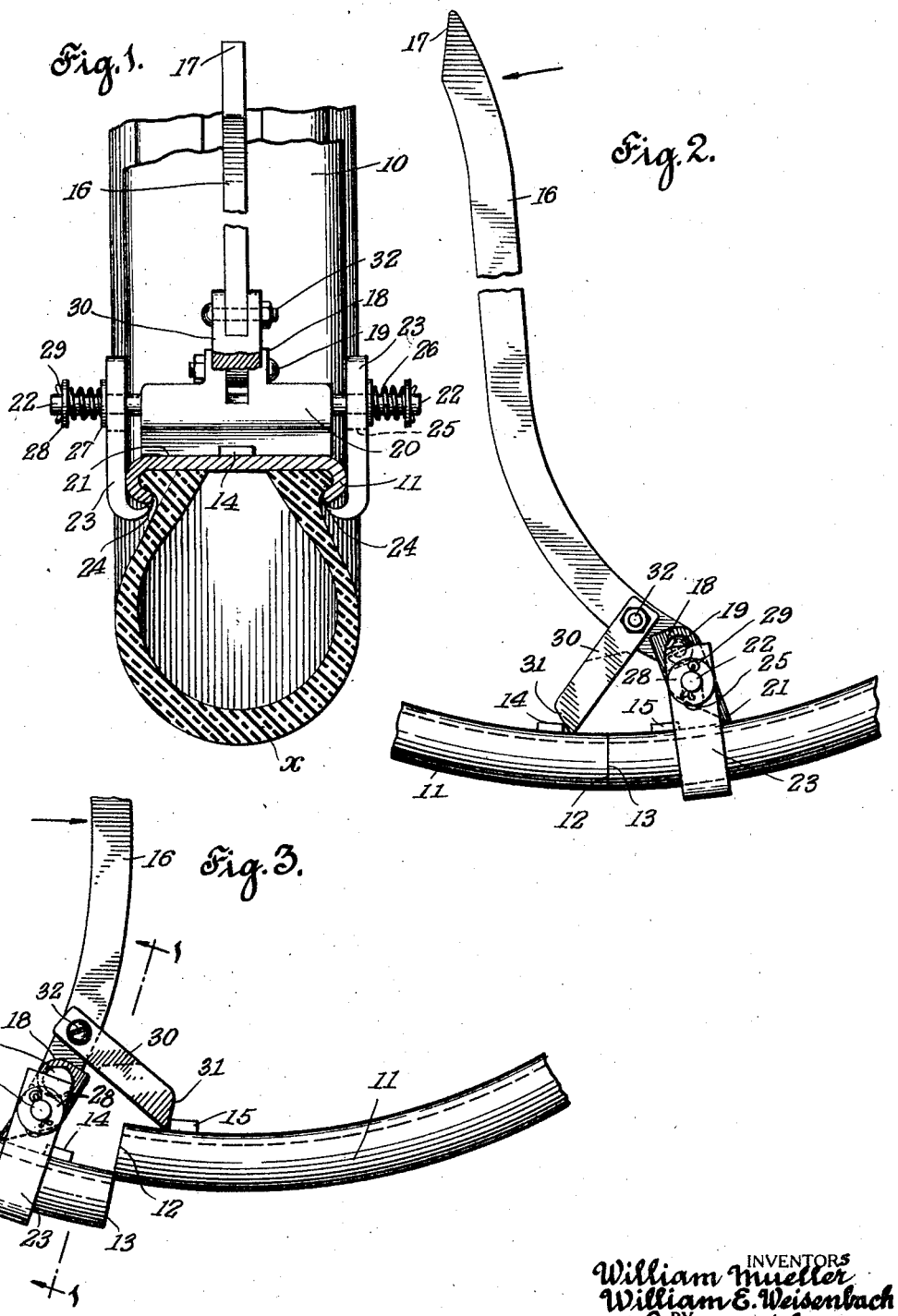

Patented Dec. 28, 1926.

1,612,203

UNITED STATES PATENT OFFICE.

WILLIAM MUELLER AND WILLIAM E. WEISENBACH, OF NEWARK, NEW JERSEY.

TIRE-RIM TOOL.

Application filed February 25, 1926. Serial No. 90,463.

This invention relates to tire rim tools as used in removing and replacing tires upon demountable rims of the split ring type.

It is one of the objects of the invention to provide a tool of this character capable of operatively engaging wheel rims of varying diameters and widths on both lateral edges thereof, without material changes or adjustments being made in the tool.

A further feature is in the provision of a small compact tool composed of few and simple parts, that may be easily applied or removed, and which is capable of efficient service.

These several aims and objects are accomplished by the novel construction, combination and arrangement of parts hereinafter described and shown in the accompanying drawings, forming a material part of this disclosure, and in which:—

Figure 1 is a transverse sectional view of a conventional demountable rim showing an embodiment of the invention engaged therewith, looking on line 1—1 of Fig. 3.

Figure 2 is a side elevational view of the same showing the tool in position to break the joint at the abutting ends of a rim.

Figure 3 is a similar view showing the tool reversed to spread the rim and re-form the joint.

Figure 4 is a transverse sectional view showing a modified form of rim tool, the view being taken approximately on line 4—4 of Fig. 5.

Figure 5 is a side elevational view of the same, showing the tool as applied in breaking the rim joint.

Figure 6 is a like view of the same, the tool being shown in reversed position as used in aligning the rim ends.

Figure 7 is a plan view of the adjustable lever in detail.

Figure 8 is a transverse sectional view taken on line 8—8 of Fig. 7.

Referring in greater detail to the drawings, a conventional channel shaped demountable rim is designated by the numeral 10, the same having opposed inreaching side flanges 11 to engage the inner elements of an ordinary inflatable tire, X as shown.

The ends of the rim, 12 and 13 respectively, may abut on a radial plane as shown or on an inclined plane as preferred, and ordinarily on the inner circumference of the rim, adjacent its ends, are fixed lugs 14 and 15 carrying means for interengaging the rim ends when in operative position.

In removing the tire X from the supporting rim, in which it is firmly seated circumferentially and held by the rim flanges, it is necessary to break the joint between the ends 12 and 13, which obviously can be only done by forcing one of the ends, as 12, inwardly, that is towards the center with respect to the tire, this being one of the objects of the present invention.

The tool consists of a hand lever 16 having at its outer end a chisel shaped element 17 adapted for insertion between a tire and its rim to pry them apart when the rim joint has been broken.

The inner end of the lever 16 is held between a pair of lugs 18 by a pivot bolt 19, the lugs extending from a block 20 having a sharp angular wedge shaped edge 21, opposite the lugs, adapted to engage the inner diameter of the rim 10 and bite to form a secure grip on its flat surface over which the block extends transversely.

A stud 22 projects from each end of the block 20, the studs being in register and reaching considerably past the sides of the rim; freely mounted on these studs are bars 23 having inturned hooks 24 at their free ends adapted to engage over the edges of the rim flanges 11.

The bars 23 contain elongated openings 25 slidable limitedly on the studs and are pressed towards the ends of the block 20, to engage the rim flanges, by coiled compression springs 26 encircling the studs between washers 27 and 28, the outer washers being held on the studs by cotter pins 29 or equivalent fastenings.

A forked fulcrum lever 30, having an angular end 31, is arranged to straddle the hand lever 16 and is pivoted to it closely adjacent the lugs 18 by a bolt 32, the lever being foldable closely adjacent when not in use.

The operation of breaking the rim joint is to dispose the block 20 on the rim, adjacent the rim end 13, engaging the hooks of the bar 23 on opposite sides of the rim and the end 31 of the fulcrum lever brought into contact with the rim lug 14 adjacent the rim end 12; it will now be seen that by moving the hand lever 16 in the direction of the arrow shown in Fig. 2, a very considerable pressure may be brought to bear against the rim end 12, causing its displacement relative to the abutting end.

In expanding the rim to re-form the joint, the tool is re-arranged on the opposite end member 12 in a similar manner but with the end 31 of the fulcrum lever 30 against the rim lug 15 and the hand lever 16 turned in an opposite direction, as shown by the arrow in Fig. 3, and the ends of the rim forced into registration to be secured by the usual means.

In the modified form, shown in Figs. 4 to 8 inclusive, a hand lever 40, provided with a bevelled outer end 41, is pivoted on a bolt 42 passed through a pair of lugs 43 formed on the outer side of a narrow elongated block 44, adapted to extend transversely across the inner periphery of the rim 11, and against which the sharp edge 45 of the block impinges.

A round rod 46 passes lengthwise through the block, its ends extending outward beyond the rim and freely mounted on the ends are flat bars 47 having hook extremities 48 to engage the opposed edges of the rim 11.

These bars are pressed inwardly towards each other by coiled compression springs 49 held between washers secured by cotter pins passing through the rod ends.

Formed on the hand lever 40, at its pivoted portion, is an enlargement partially containing a longitudinal slot 50 at the ends of which are right angled recesses 51 and 52, respectively upper and lower.

A headed stud 53 is movably engaged in the slot 50, this stud being carried in a fork 54 extending from a bar 55 in which is a fixed threaded stud 56 provided with a wing nut 57.

A plate 58, provided with a groove 59 to receive the bar 55, is adjustably secured by the stud 56, and at one end of the plate are fork-like projections 60 having sharply bevelled ends adapted to impinge against the inner surface of the rim, the projections straddling the raised lugs 14 and 15 at will.

In the operation of breaking the rim joint the tool is applied as shown in Fig. 5, the plate 58 and bar 55 being held in rigid extended position by the bolt and nut, acting together as a fulcrum for the lever 40, which if moved in the direction of the arrow, will raise one end of the rim relative to the other, the pivot 53 being at that time in the recess 52.

In remaking the rim-joint the plate 58 is reversed relative to the bar 55, as seen in Fig. 6, the pivot 53 being disposed in the recess 51 and the free end of the bar 55 set against the lug 14, whereupon movement of the hand lever in the direction of the arrow will act to bring the ends of the rim into registration.

It is to be noted that a very considerable range of adjustment, with respect to varying widths of rims, is attainable and that the tool is capable of rapid handling in performing its functions, as well as being compactly folded when not in operation.

Although the foregoing is descriptive of preferred embodiments of the invention, it will be apparent that minor changes may be made in its construction, without the exercise of invention or conflicting with the scope of the claims hereto appended.

Having thus described our invention, what we claim as new and desire to secure by Letters Patent, is:—

1. A tire rim tool comprising a block to extend transversely across the inner surface of a rim, a hand lever pivoted to said block, opposed hooks pivoted at the ends of said block to engage the rim flanges adjacent one end of the rim, and a fulcrum element pivoted to said lever adjacent the block to engage the opposite ends of the rim.

2. A tire rim tool comprising an elongated block adapted to extend transversely across the flat inner surface of a rim, said block having an acute angular edge to impinge the rim, a hand lever pivoted in said block, adjustable hooks on the ends of said block to engage the rim on opposite side thereof, and a fulcrum element pivoted to said lever adjacent said block.

3. A tire rim tool comprising a block having adjustable spring impelled hook means to engage a rim near one of its ends, a hand lever pivoted in said block, and a forked abutment pivoted to said hand lever to engage the opposite end of the rim, said tool being reversible to break the rim joint when in one position and to reset the joint when in another position.

4. A tire tool comprising an elongated block adapted to extend transversely across the flat inner surface of a rim, a hand lever pivoted centrally in said block, studs extending from the ends of said block past the flanges of a rim, bars pivoted on said studs, resilient means for pressing said bars towards each other, hooks on said bars to engage the rim flanges, and a pivoted fulcrum carried by said lever to engage the end of the rim opposite the end engaged by said hooks.

5. A tire rim tool comprising a block to extend across the inner surface of a tire rim, hooks pivoted at the ends of said block to engage on opposite sides of a rim, a hand lever pivoted in said block, said lever having a slot with recesses at its ends, a forked bar slidably and pivotally connected with the slot, a forked plate reversibly mounted on said bar, and means for rigidly engaging said plate and bar when in either of its adjusted positions, said plate and bar acting as a fulcrum for the hand lever when breaking the rim joint.

6. A tire rim tool comprising a block to extend across the inner surface of a tire rim, hooks pivoted at the ends of said block to engage on opposite sides of a rim, a hand lever pivoted in said block, said lever having a slot with recesses at its ends, a forked bar straddling said hand lever, a stud fixed in the forks of said bar to operatively engage in the slot and either of its end recesses, said bar acting as a fulcrum when said stud is in one recess whereby the lever may restore the rim to its normal position, and a plate reversibly mounted on said bar whereby, when said stud is in the other recess, to break the rim joint upon operation of said lever 7. A tire rim tool comprising a block to extend across the inner surface of a tire rim, hooks pivoted at the ends of said block to engage on opposite sides of a rim, a hand lever pivoted in said block, a bar adjustable on said lever, means for confining the bar thereto, a plate grooved to receive said bar, said plate being reversible thereon, and means for rigidly securing said plate and bar when in adjustment, said plate acting as a fulcrum for the hand lever in breaking a rim joint and said bar acting as a fulcrum when making the rim joint.

This specification signed and witnessed this 27th day of January, 1926.

WILLIAM MUELLER.
WILLIAM E. WEISENBACH.